United States Patent
Froula

(10) Patent No.: US 6,356,767 B2
(45) Date of Patent: Mar. 12, 2002

(54) METHOD AND APPARATUS FOR CONTROLLING MOBILE ACCESS TO A WIRELESS COMMUNICATION SYSTEM

(75) Inventor: Donald R. Froula, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/783,154

(22) Filed: Feb. 14, 2001

Related U.S. Application Data

(60) Provisional application No. 60/185,770, filed on Feb. 29, 2000.

(51) Int. Cl.[7] .............................. H04B 7/00; H04Q 7/20; H04M 11/00
(52) U.S. Cl. ....................... 455/512; 455/509; 455/513; 455/515; 455/450; 455/404
(58) Field of Search ................................. 455/422, 423, 455/435, 450, 446, 452, 453, 509, 510, 512, 513, 515, 560, 561, 404

(56) References Cited

U.S. PATENT DOCUMENTS

| | | | |
|---|---|---|---|
| 5,432,780 A | * | 7/1995 | Smith et al. ................. 370/297 |
| 5,513,210 A | * | 4/1996 | Vook et al. .................. 375/133 |
| 5,729,542 A | * | 3/1998 | Dupont ........................ 370/346 |
| 5,737,691 A | * | 4/1998 | Wang et al. ................. 455/452 |
| 5,794,156 A | * | 8/1998 | Alanara ....................... 455/517 |
| 5,862,452 A | * | 1/1999 | Cudak et al. ................ 455/321 |
| 6,208,865 B1 | * | 3/2001 | Veerasamy ................. 455/450 |

* cited by examiner

Primary Examiner—Dwayne Bost
Assistant Examiner—Raymond B. Persino
(74) Attorney, Agent, or Firm—Steven A. May

(57) ABSTRACT

The present invention provides a method and an apparatus for controlling mobile access to a wireless communication system. A base station (145) in a communication cell (165) monitors a plurality of mobile access parameters. The base station (145) generates control information based on the plurality of mobile access parameters. The base station (145) provides mobile stations (185, 190) within the communication cell (165) with the control information to control access to the communication system by mobile stations (185, 190) based on the mobile access overload class of the mobile stations (185, 190) and the type of mobile access attempted by the mobile stations (185, 190).

19 Claims, 2 Drawing Sheets

METHOD AND APPARATUS FOR CONTROLLING MOBILE ACCESS TO A WIRELESS COMMUNICATION SYSTEM

CROSS-REFERENCE TO RELATED APPLICATION

This application is based on prior U.S. patent application Ser. No. 60/185,770, filed Feb. 29, 2000, and priority thereto is hereby claimed.

FIELD OF THE INVENTION

The present invention relates generally to wireless communication systems, and more particularly, to a method and an apparatus for controlling mobile access to a wireless communication system.

BACKGROUND OF THE INVENTION

A wireless communication system is a complex network of systems and elements. Typical elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a mobile switching center (MSC), for routing calls within the system, and (5) a link to the land line or public switch telephone network (PSTN), which is usually also provided by the MSC.

In a wireless communication system, a mobile station typically communicates to a base station over several communication channels, e.g., a control channel, a traffic channel, and an access channel. In particular, the mobile station uses the access channel to signal to the base station, via a mobile access message, a request to obtain communication services, i.e., to access the communication system. The mobile access message may be, but is not limited to, a registration, a data burst message, a page acknowledgment, and a call origination initiated by the mobile station that is transmitted via the access channel to the base station. However, only unsolicited mobile access messages, i.e., originated without prompting by the base station, may be controlled to access the communication system. Specifically, unsolicited mobile access messages include registrations, data burst messages, and call originations. A registration indicates the status of the mobile station, i.e., whether the mobile station is active or inactive, or the location of the mobile station, i.e., whether the mobile station has moved into a different sector within a communication cell. A data burst message includes a textual message which may be destined for another mobile station, to a pager or a MSC. A call origination is a request by the mobile station to initiate a voice or data call.

One aspect of designing wireless communication systems is to ensure a high level of access to the communication system by the mobile stations. It is especially important that mobile stations are able to access the communication system in critical situations or where the mobile stations are identified as having high priority. The communication system must also prevent such critical and high priority mobile stations from being indiscriminately denied access by base stations within the communication system when the base stations experience overload conditions.

In critical situations, such as an earthquake or any other type of natural disaster, a high volume of mobile access messages originated by mobile stations is quite natural. Accordingly, critical mobile access messages should have higher priority to access the communication system than other non-critical registrations, data burst messages, or call originations. For example, a voice call originated from a mobile station used by a fire fighter to request for more assistance should have higher priority than other non-critical mobile access messages. Other critical mobile access messages include access messages originated from mobile stations used for special purposes such as, but not limited to, system maintenance. However, current wireless communication systems indiscriminately deny mobile access to the communication system without taking either the source or the type of a mobile access message into consideration. Therefore, the call origination by the mobile station used by the fire fighter in the example above or a data burst message from a mobile station used for system maintenance may be indiscriminately denied access to current wireless communication systems.

Because the base station under overload conditions permits any mobile access up to the capacity of the communication system, regardless of the importance associated with the mobile access, non-critical mobile stations or access types may have access to the communication system over critical or high priority mobile stations or access types. Therefore, a need exists for a method and an apparatus for controlling mobile access to a communication system based upon the availability of system capacity, and prioritizing of the mobile stations and the access types seeking access to the communication system.

DETAILED DESCRIPTION OF THE PREFERRED EMBODIMENTS

Figure 1:
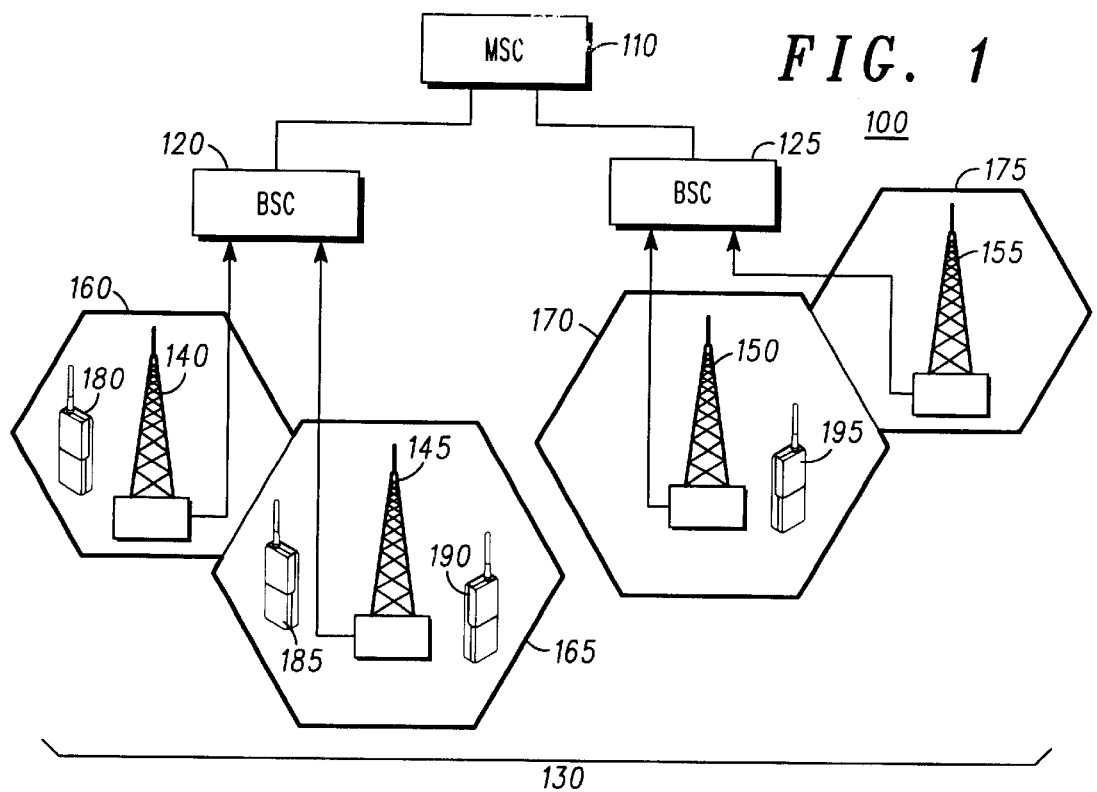
FIG. 1 is a block diagram representation of a wireless communication system that may be adapted to operate in accordance with the preferred embodiments of the present invention.

The present invention provides a method and an apparatus for controlling mobile access to a communication system via an access channel by providing control information to mobile stations. A base station, which provides communication services for mobile stations in a communication cell, monitors a plurality of mobile access parameters. In particular, the base station monitors access types such as registrations only, data burst messages only, and an aggregate of all mobile accesses originated within the communication cell, and the rate of the access types. Based on the rate of the access types, the base station generates control information to control access to the communication system by certain mobile stations or type of mobile access.

The control information generally includes a plurality of persistence access control parameters that may be, but are not limited to, a base persistence value and a persistence modifier. The base persistence value is associated with and identifies the mobile access overload class of a mobile station and an access restriction level for all access types in each access overload class. In particular, an ordinary mobile station used by the general population belongs to the mobile access overload class in the range from zero (0) to nine (9), and a mobile station for special purposes such as emergency or system maintenance belongs to the mobile access overload class in the range from eleven (11) to fifteen (15). For example, a mobile station for system maintenance may receive higher priority for system access than a mobile station that belongs to the mobile access overload class of eight (8). The persistence modifier is associated with and identifies the type of mobile access attempted by the mobile station. Accordingly, the present invention controls mobile access to the communication system by generating control information associated with the mobile access overload class of the mobile station attempting to access the communication system and the type of the mobile access.

The base station provides the control information in an access parameters message via a paging channel to mobile stations in the communication cell. Prior to an attempt to establish access to the communication system, a mobile station receives the access parameters message carrying the control information, and uses the control information to determine if a mobile access is allowed based on access type and the current capacity of an access channel. As a result, certain overload class of mobile stations or type of mobile access may be denied access to the communication system. For example, a mobile station with a high priority overload class attempts to access the communication system in an access channel overload situation by making an emergency #911 call. The present invention prevents such a mobile station from being denied service with other non-critical mobile access attempts originating within the same communication cell. Therefore, to prevent mobile stations attempting access from being indiscriminately denied services, the base station monitors a plurality of mobile access parameters including access types and the rate of the type of access, generates control information based on the plurality of mobile access parameters, and provides the mobile stations within the communication cell with the control information, from which they may determine whether to attempt a mobile access based on the overload class of the mobile stations and the type of the mobile access attempted by the mobile stations.

The present invention is described in terms of several preferred embodiments, and particularly, in terms of a wireless communication system operating in accordance with at least one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS) and variations and evolutions of these protocols. As shown in FIG. 1, a wireless communication system 100 includes a mobile switching center (MSC) 110, a plurality of base station controllers (BSC), generally shown as 120 and 125, servicing a total service area 130. As is known for such systems, each BSC 120 and 125 has associated therewith a plurality of base stations (BS), generally shown as 140, 145, 150, and 155, servicing communication cells, generally shown as 160, 165, 170, and 175, within the total service area 130. The MSC 110, BSCs 120 and 125, and base stations 140, 145, 150, and 155 are specified and operate in accordance with the applicable standard or standards for providing wireless communication services to mobile stations (MS), generally shown as 180, 185, 190, and 195, operating in communication cells 160, 165, 170, and 175, and each of these elements are commercially available from Motorola, Inc. of Schaumburg, Ill.

Figure 2:
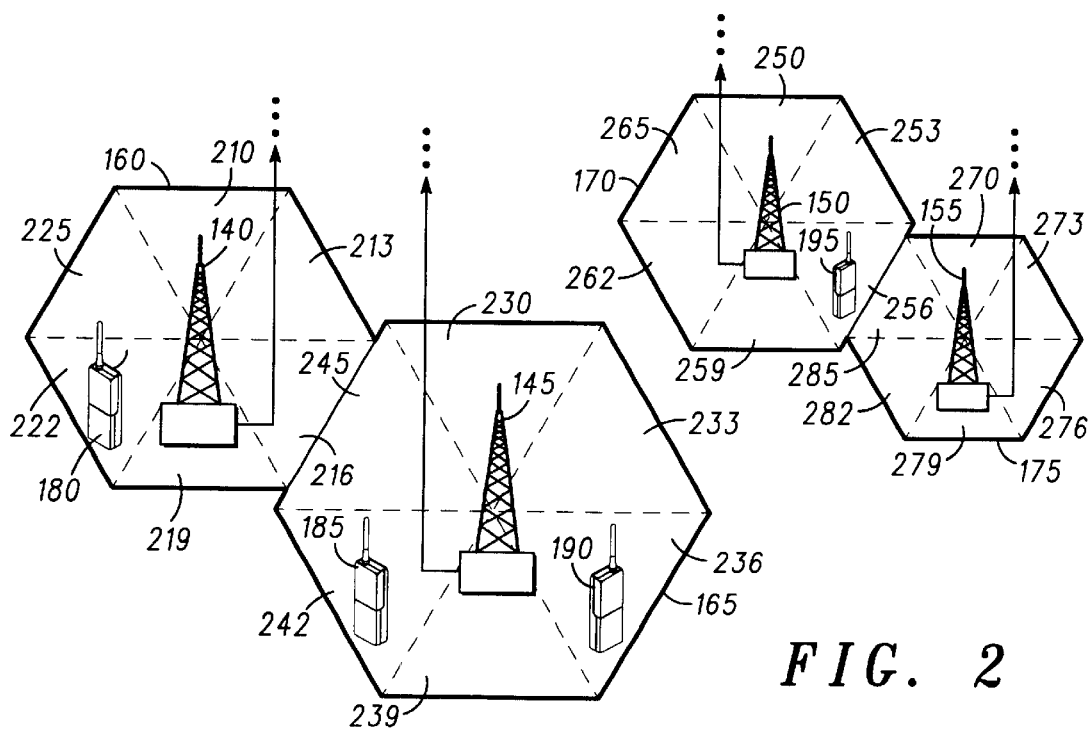
FIG. 2 is a block diagram representation of a plurality of communication cells that may be adapted to operate in accordance with the preferred embodiments of the present invention.

As mentioned above, the communication cells 160, 165, 170, 175 in the wireless communication system 100 are divided into a plurality of sectors. Furthermore, each sector is served by a different set of channels to provide communication services between the mobile stations and the base station servicing the communication cell. Now referring to FIG. 2, the communication cells, generally shown as 160 and 165, are broken up into a plurality of sectors, generally shown as 210, 213, 216, 219, 222, 225, and 230, 233, 236, 239, 242, 245, respectively. Similarly, the communication cells 170 and 175 are broken up into a plurality of sectors, generally shown as 250, 253, 256, 259, 262, 265, and 270, 273, 276, 279, 282, 285, respectively. Each sector is served by a channel for communication to and from a base station associated with the sector. For example, in sector 242 of the communication cell 165, the mobile station 185 communicates with the base station 145 on a first access channel. Similarly, in sector 236 of the communication cell 165, the mobile station 190 communicates with the base station 145 on a second access channel. The access channels are used for short signaling messages, i.e., mobile access messages, such as call originations, page acknowledgments, data burst messages, and registrations, from the mobile stations 185 and 190 to the base station 145. The base station 145 uses first and second paging channels to communicate with the mobile stations 185 and 190, respectively. The paging channels are used for transmission of control information, which is further discussed in details below, and pages from the base station 145 to the mobile stations 185 and 190. Also, each sector may be associated with a carrier to form a sector-carrier pair for the base stations and the mobile stations to communicate with each other.

In each communication cell of communication system 100 (e.g., communication cell 165), a base station (e.g., base station 145) monitors a plurality of mobile access parameters to provide communication services to the mobile stations (e.g., mobile stations 185 and 190) within the communication cell. The plurality of mobile access parameters are associated with and identify mobile accesses originated within the plurality of sectors (e.g., sectors 230, 233, 236, 239, 242, 245) of the communication cell. For example, with respect to communication cell 165, the plurality of mobile access parameters are associated with the mobile access originated from the mobile stations 185 and 190 via the first and second access channels, respectively.

The plurality of mobile access parameters generally includes a first mobile access parameter, a second mobile access parameter, and a third mobile access parameter. In particular, the first mobile access parameter is associated with all access channel events such as registrations, data burst messages, page acknowledgments, and call originations that originated within the communication cell 165. The first mobile access parameter is used to control all mobile access traffic that originated from the mobile stations 185 and 190 within the communication 165. The second mobile access parameter is associated with registration traffic only and is used to control registrations. The third mobile access parameter is associated with data burst message traffic only and is used to control data burst messages. The base station 145 generates control information based on the plurality of mobile access parameters. The control information is generated to control mobile access to the communication system 100 by certain mobile access overload class or type of mobile access. As mentioned above, the control information generally includes a plurality of persistence access control parameters that mobile stations 185 and 190 may use to determine the whether to attempt to access the communication system 100.

Accordingly, the base station 145 provides control information in an access parameter message to the mobile stations 185 and 190 via the first and second paging channels. Prior to attempting to access the communication system 100 by transmitting a mobile access message via an access channel allocated to a respective sector 242, 236 in the communication cell 165, each mobile station 185, 190 uses the control information to determine the availability of the communication cell 165, that is, whether the base station 145 is overloaded and there is a potential of a failure of the mobile access. Also, each mobile station 185, 190 uses the control information to prioritize the mobile station's access attempt based on the source and the type of access, that is, the base persistence value and the persistence modifier, respectively.

When the number or rate of mobile accesses exceeds the fixed access channel capacity, the base station 145 becomes overloaded and may indiscriminately permit mobile accesses originated within the sectors 230, 233, 236, 239, 242, 245 of the communication cell 165 unless the mobile access attempts are managed and controlled. Mobile access is described as indiscriminant in that additional mobile accesses are permitted as capacity permits without regard to the mobile classification or type of access request. According to a preferred embodiment of the invention, each mobile station 185, 190 uses the control information provided by the base station 145 to determine the condition of the base station 145, i.e., whether it is presently in an overloaded condition, prior to making an access attempt. In particular, each mobile station 185, 190 determines the probability to transmit a mobile access message on an access channel based on the condition of the sectors 230, 233, 236, 239, 242, and 245 in the communication cell 165, the access overload class of the mobile station 185, 190, and the type of access being attempted by the mobile station 185, 190. For example, the mobile station 185 may belong to a class for special purposes such as emergency, test, or system maintenance, and the mobile station 190 may be an ordinary mobile station, i.e., the mobile station belongs to the mobile access overload class in the range from zero (0) to nine (9). In this case, the mobile station 185 receives higher priority to request service via an associated access channel than the mobile station 190.

In a wireless communication system such as, but not limited to, a code division multiple access (CDMA) based communication system, the control information generally includes a plurality of persistence access control parameters for use by a mobile station to determine the condition of a base station servicing the mobile station as one of ordinary skill in the art will readily recognize. In particular, the plurality of persistence access control parameters are based on the plurality of mobile access parameters monitored by the base station. The plurality of persistence access control parameters generally include, but are not limited to, a base persistence value and a persistence modifier.

The base persistence value is associated with the first mobile access parameter and identifies an access overload class of a mobile station, which ordinarily corresponds to the last digit of a mobile station identifier or an international mobile subscriber identity (IMSI). Typically, mobile stations used by the general population belong to a mobile access overload class within a range of zero (0) through nine (9). A base persistence value PSIST(0–9) is a six-bit value that is used to control mobile access attempted by mobile stations belonging to the mobile access overload class within the range of zero (0) through nine (9). Mobile stations for special purposes such as emergency, test, and system maintenance belong to a mobile access overload class within a range of ten (10) through fifteen (15). For example, mobile access overload class ten (10) is typically associated with and identifies emergency mobile stations, and mobile access overload class eleven (11) is typically associated with and identifies test mobile stations. A base persistence value PSIST(N) is a six-bit value that is used to control access attempts by mobile stations belonging to the mobile access overload class within the range of ten (10) through fifteen (15).

The persistence modifiers REG_PSIST and MSG_PSIST are respectively associated with the second mobile access parameter and the third mobile access parameter, and identify a mobile access type that is either a registration or a data burst message, respectively. In particular, the persistence modifier REG_PSIST, which is associated with the second mobile access parameter, is a three-bit value that is used to increase the restriction level provided by the base persistence value for registration accesses on the access channel. The persistence modifier MSG_PSIST, which is associated with the third mobile access parameter, is a three-bit value that is used to increase restriction level provided by the base persistence value for data burst messages on the access channel. Call originations are controlled by the base persistence value, i.e., PSIST(0–9) or PSIST(N), only. Therefore, in accordance with a preferred embodiment of the invention, call originations from a mobile station are less likely to be denied access to the communication system than a registration or a data burst message from the same mobile station if the persistence modifier REG_PSIST or MSG_PSIST values, respectively, are non-zero.

Prior to making an access attempt, a mobile station, such as mobile stations 185 and 190, internally generates a pseudorandom number between zero (0) and one (1) and determines an access value (P). The access value (P) directly indicates the probability the mobile station will be permitted to make an access attempt by transmitting a mobile access message via an access channel. In particular, the access value (P) is based on one or both of the base persistence value and the persistence modifier. The expressions to determine the access value (P) for a mobile station that belongs to a mobile access overload class with a range from zero (0) through nine (9), such as mobile station 185, are as follow:

(1) $P = 2^{-PSIST(0-9)/4} * 2^{-REG\_PSIST}$ if the access attempt is a registration, (2) $P = 2^{-PSIST(0-9)/4} * 2^{-MSG\_PSIST}$ if the access attempt is a data burst message, or (3) $P = 2^{-PSIST(0-9)/4}$ if the access attempt is a call origination.

As shown in expression (3), a call origination is restricted by a base persistence value only. Accordingly, a call origination from a mobile station has a greater probability of success, i.e., less likely to be denied of communication service by the base station, than a registration or a data burst message. Thus, a call origination has higher priority than a registration or a data burst message from the same mobile station.

The expressions to determine the value P for a mobile station that belongs to a mobile access overload class (N) with a range from ten (10) through fifteen (15), such as mobile station 190, are as follow:

(1) $P=2^{-PSIST(N)}*2^{-REG\_PSIST}$ if the mobile access is a registration, (2) $P=2^{-PSIST(N)}*2^{-MSG\_PSIST}$ if the mobile access is a data burst message, or (3) $P=2^{-PSIST(N)}$ if the mobile access is a call origination.

Similar to a call origination by a mobile station that belongs to a mobile access overload class with a range from zero (0) through nine (9), a call origination by a mobile station that belongs to a mobile access overload class (N) with a range from ten (10) through fifteen (15) is controlled by a base persistence value only.

After the access value (P) is determined, it is compared to the pseudorandom number. If the value P is greater than the pseudorandom number then the mobile station is permitted to make an access attempt via the access channel. If the value P is less than the pseudorandom number then the mobile station waits until a next opportunity to transmit on the access channel is available and repeats the process by generating a pseudorandom number again to determine the value P.

Figure 3:
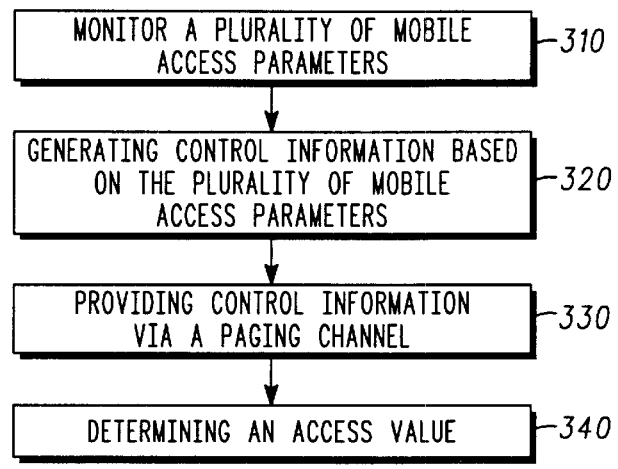
FIG. 3 is a flow diagram illustrating a method for controlling mobile access to a wireless communication system in accordance with the preferred embodiments of the present invention.

In accordance with the preferred embodiments of the present invention, and with references to FIG. 3, a method 300 for controlling mobile access to a wireless communication system is shown. Method 300 begins at step 310, where a base station monitors a plurality of mobile access parameters. In particular, the base station monitors a first mobile access parameter, a second mobile access parameter, and a third mobile access parameter. The first mobile access parameter is associated with all mobile access traffic that originated from mobile stations within a single sector in a communication cell serviced by the base station. The second mobile access parameter is associated with only registration traffic that originated from mobile stations within the plurality of sectors in the communication cell. The third mobile access parameter is associated with only data burst message traffic that originated from mobile stations within the plurality of sectors in the communication cell. At step 320, the base station generates control information based on the plurality of mobile access parameters. As mentioned above, the control information includes a plurality of persistence access control parameters, which are based on the plurality of mobile access parameters. In particular, the base persistence value, i.e., PSIST(0-9) or PSIST(N), is based on all of the mobile access parameters. The persistence modifier, i.e., REG_PSIST or MSG_PSIST, is based on either the second mobile access parameter or the third mobile access parameter, respectively. Whether a mobile station is permitted to make an access attempt through the access channel is based on the access value P, which is determined by the plurality of persistence access control parameters. At step 330, the base station provides mobile stations in the communication cell with an access control message carrying the control information via a paging channel to control mobile access to the communication system. Prior to making an access attempt, at step 340 the mobile stations use the plurality of persistence access control parameters, i.e., base persistence value and persistence modifier, in the control information to determine an access value (P) as described above. The value P is based on the mobile access overload class of the mobile station attempting the mobile access and the type of the mobile access.

Figure 4:
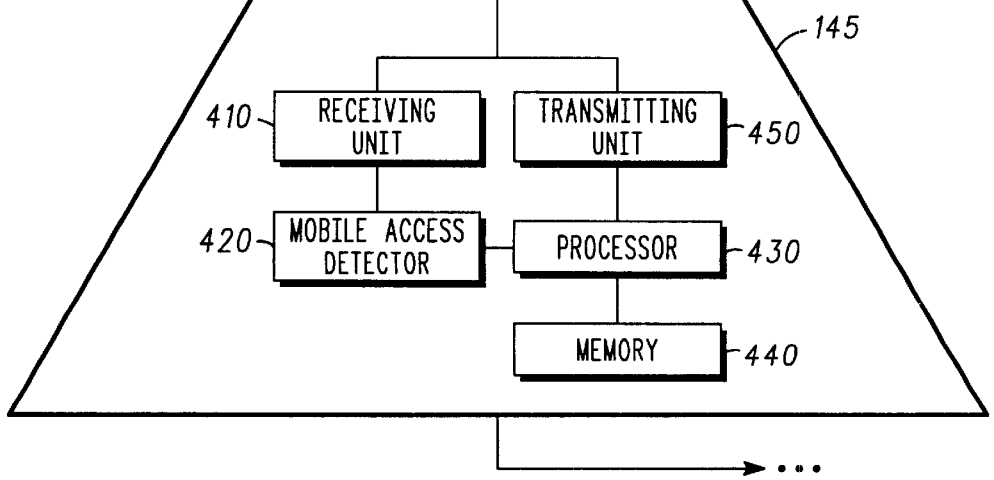
FIG. 4 is a block diagram illustrating an apparatus for controlling mobile access to a wireless communication system in accordance with the preferred embodiments of the present invention.

Referring to FIG. 4, a base station, such as base stations 140, 145, 150, and 155, is adapted in accordance with a preferred embodiment of the invention to control mobile access to a communication system via an access channel. The base station (e.g., base station 145) generally includes a receiving unit 410, a mobile access detector 420, a processor 430, a memory 440, and a transmitting unit 450. The receiving unit 410 receives mobile access messages originated from mobile stations (e.g., mobile stations 185 and 190) in a communication cell (e.g., communication cell 165) serviced by the base station (i.e., base station 145).

The mobile access detector 420, which is coupled to the receiving unit 410 and the processor 430, monitors a plurality of mobile access parameters including a first mobile access parameter, a second mobile access parameter, and a third mobile access parameter. In particular, the first mobile access parameter is associated with all mobile access traffic including registrations, data burst messages, page acknowledgments, and call originations that originated from the mobile stations 185 and 190 in the communication cell 165. The second mobile access parameter is associated with only registration traffic that originated from mobile stations 185 and 190 in the communication cell 165. The third mobile access parameter is associated with only data burst message traffic that originated from mobile stations 185 and 190 in the communication cell 165. The mobile access detector 420 relays the plurality of mobile access parameters to the processor 430 to generate control information based on the plurality of mobile access parameters.

The memory 440, which is coupled to the processor 430, stores a program or operating instructions for the processor 430. The processor 430 executes the program or a set of operating instructions such that the base station 145 operates in accordance with a preferred embodiment of the invention. Alternatively, the program or the set of operating instructions may be embodied in a computer-readable medium such as, but not limited to, paper, a programmable gate array, application specific integrated circuit, erasable programmable read only memory, read only memory, random access memory, magnetic media, and optical media. In particular, the control information includes a plurality of persistence access control parameters.

The transmitting unit 450, which is coupled to the processor 420, transmits the control information in an access control message via the paging channels of the communication cell. The mobile stations 185 and 190 receive the access control message and use the control information to determine whether they are permitted to make an access attempt. Accordingly, the mobile stations 185 and 190 are not indiscriminately denied access by the base station 145.

Many changes and modifications could be made to the invention without departing from the fair scope and spirit thereof. The scope of some changes is discussed above. The scope of others will become apparent from the appended claims.

What is claimed is:

1. In a wireless communication system providing communication services for a communication cell having a plurality of sectors, wherein each sector includes an access channel and a paging channel, a method for controlling mobile access to the communication system via the access channel, the method comprising steps of:

monitoring a plurality of mobile access parameters;

generating control information based on the plurality of mobile access parameters, wherein the control information comprises at least one or more of a base persistence value and a persistence modifier;

providing control information to a mobile station through the paging channel; and wherein the mobile station is adapted to access the communication system in accordance with the control information and wherein the plurality of mobile access parameters are associated with mobile access originated from the plurality of sectors in the communication cell.

2. The method of claim 1, wherein the mobile access comprises at least one or more of a data burst message, a registration, a page acknowledgment, and a call origination.

3. The method of claim 1, wherein the step of monitoring a plurality of mobile access parameters includes a step of monitoring at least one or more of a first mobile access parameter, a second mobile access parameter, and a third mobile access parameter.

4. The method of claim 3, wherein the first mobile access parameter is associated with a mobile access originated within one of the plurality of sectors in the communication cell.

5. The method of claim 3, wherein the second mobile access parameter is associated with a registration originated within one of the plurality of sectors in the communication cell.

6. The method of claim 3, wherein the third mobile access parameter is associated with a data burst message originated within one of the plurality of sectors in the communication cell.

7. The method of claim 1, wherein the step of monitoring a plurality of mobile access parameters comprises a step of monitoring an access rate of the plurality of mobile access.

8. The method of claim 1, wherein the base persistence value identifies at least one or more of an overload class, a restriction level for each of the plurality of mobile access, and an access type.

9. The method of claim 1, wherein the persistence modifier comprises at least one or more of a registration persistence value and a message persistence value.

10. In a wireless communication system providing communication services for a communication cell having a plurality of sectors, wherein each sector includes an access channel and a paging channel, an apparatus for controlling mobile access to the communication system via the access channel, the apparatus comprising:

a mobile access detector adapted to monitor a plurality of mobile access parameters;

a memory adapted to contain operating instructions;

a processor coupled to the memory and the mobile access detector, the processor operable on the base station in accordance with the operating instructions to generate control information based on the plurality of mobile access parameters, wherein the control information comprises at least one or more of a base persistence value and a persistence modifier;

a transmitting unit coupled to processor; and wherein the transmitting unit provides control information through the paging channel and wherein the plurality of mobile access parameters are associated with mobile access originated from the plurality of sectors in the communication cell.

11. The apparatus of claim 10, wherein the mobile access comprises at least one or more of a data burst message, a registration, a page acknowledgment, and a call origination.

12. The apparatus of claim 10, wherein the plurality of mobile access parameters comprises at least one or more of a first mobile access parameter, a second mobile access parameter, and third mobile access parameter.

13. The apparatus of claim 12, wherein the first mobile access parameter is associated with a mobile access originated within one of the plurality sectors in the communication cell.

14. The apparatus of claim 12, wherein the second mobile access parameter is associated with a registration originated within one of the plurality of sectors in the communication cell.

15. The apparatus of claim 12, wherein the third mobile access parameter is associated with a data burst message originated within one of the plurality of sectors in the communication cell.

16. The apparatus of claim 1, wherein the base persistence value identifies at least one or more of an overload class and an access type.

17. The apparatus of claim 1, wherein the persistence modifier comprises at least one or more of a registration persistence value and a message persistence value.

18. In a wireless communication system providing communication services for a communication cell having a plurality of sectors, wherein each sector includes an access channel and a paging channel, and wherein a processor operates in accordance to a computer program embodied on a computer-readable medium for controlling mobile access to the communication system via the access channel, the computer program comprising:

a first routine that directs the processor to monitor a plurality of mobile access parameters;

a second routine that directs the processor to generate control information based on the plurality of mobile access parameters, wherein the control information comprises at least one or more of a base persistence value and a persistence modifier;

a third routine that directs the processor to provide control information through the paging channel; and wherein the plurality of mobile access parameters are associated with mobile access originated within the plurality of sectors in the communication cell.

19. The computer program of claim 18, wherein the medium comprises one of paper, a programmable gate array, application specific integrated circuit, erasable programmable read only memory, read only memory, random access memory, magnetic media, and optical media.

* * * * *